June 16, 1964     W. J. RAWLINSON     3,137,073
AGRICULTURAL CROP PLANTING MEASURER
Filed Aug. 7, 1961     2 Sheets-Sheet 1
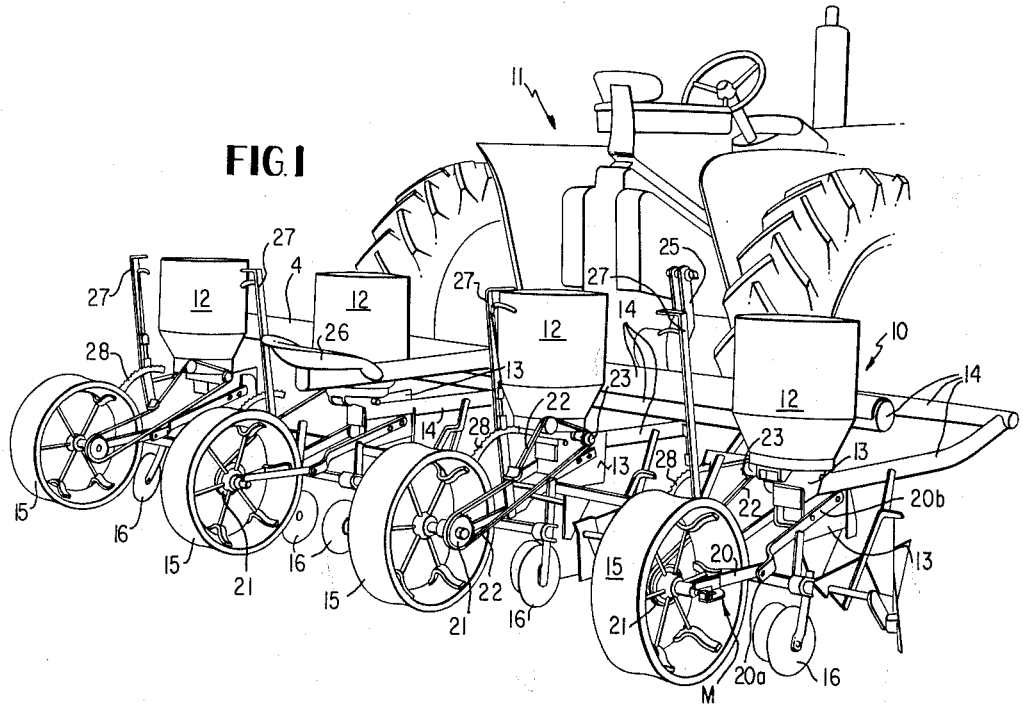
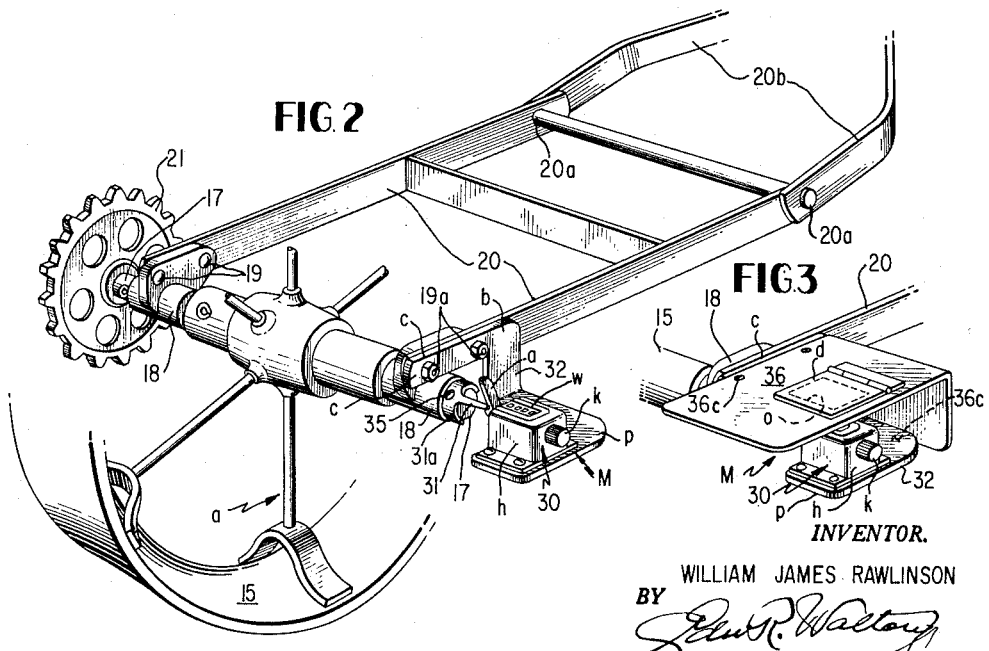
INVENTOR.
WILLIAM JAMES RAWLINSON
BY
ATTORNEY June 16, 1964  W. J. RAWLINSON  3,137,073
AGRICULTURAL CROP PLANTING MEASURER
Filed Aug. 7, 1961  2 Sheets-Sheet 2

INVENTOR.
WILLIAM JAMES RAWLINSON
BY
*Edw.R.Walton*
ATTORNEY

United States Patent Office 3,137,073
Patented June 16, 1964

3,137,073
AGRICULTURAL CROP PLANTING MEASURER
William James Rawlinson, Manning, S.C., assignor to Carolina Farm Service, Inc., Manning, S.C., a corporation of South Carolina
Filed Aug. 7, 1961, Ser. No. 129,769
1 Claim. (Cl. 33—142)

The present invention relates to an improved agricultural crop planting-measurer.

It has now become important to farmers, due to the crop-acreage control laws of the United States, that only the correct allotment of acreage be planted because an overplanting—even through mistake or inadvertence—results in destruction of the overplanted crop, as well as other penalties imposed by law, and an underplanting results in an economical loss to the farmer.

Heretofore, farmers have had to pre-measure acreage of land, many having odd-shaped fields, before planting a crop in an endeavor to comply with the Governmental regulations as to the acreage to be planted. This pre-measuring is not only time consuming and hard labor, but occurs usually at their most busy season on a farm. Many farmers, because they were not qualified to measure land properly and accurately, particularly if in odd-shaped fields, have had to hire more qualified persons to do this work which is expensive, and frequently such qualified persons are not available when needed.

The present invention overcomes these drawbacks by the use of an odometer so that any farmer may measure the acreage planted as it is being planted.

While there have been prior proposals of employing an odometer with planters, seeder and other agricultural implements, these proposals, so far as is known to me, are comparatively complicated in their construction and/or attachment to such implements and are not arranged and positioned to give the most accurate indication or record of the acreage planted—thus, has not come into general use for whatever reason there may be. Nevertheless, as a consequence, there still remains a need and long-felt want for a very inexpensive crop planting-measurer of simple construction and smallness in size that may be applied and removed from planters and seeders of the improved present-day type, whereby accurate crop acreage can be planted without pre-measurement and whereby a continuous check can be maintained upon the amount of seed that is dispensed or planted and/or the amount of fertilizer that is being applied to said planting, as well as upon the rate of herbicidal chemicals being applied (which are coming into use for pre-emergence weed and grass control).

The prime object, therefore, of this invention is to provide such a simple and inexpensive crop planting-measurer device, consisting of a minimum of parts, that may be applied to or removed from a planter by the farmer himself with ease, and which device will accurately measure the acreage planted only to fulfill the need and want above enumerated.

The above object is attained by the organization and construction of elements hereinafter more fully described in the following specification and illustrated in the accompanying drawings; and the novel features of the device will be pointed out in the appended claims.

The invention is illustrated in the accompanying drawing as it is now manufactured and sold. However, it is to be understood that changes may be made in the form, size, proportions and in other minor details of construction without departing from or sacrificing any of the advantages of the invention so long as said changes fall within the scope of the appended claims.

In the drawings:

FIGURE 1 is a rear perspective view of a present-day four-row planter equipped with the invention, at M, and showing the pulling-tractor fragmentarily outlined;

FIGURE 2 is a perspective view of a presser-wheel frame of the planter and having parts of the invention mounted thereon and on the axle of said presser-wheel;

FIGURE 3 is a fragmentary perspective view of the presser-wheel showing the device of the invention covered by a shielding plate;

Figure 7:
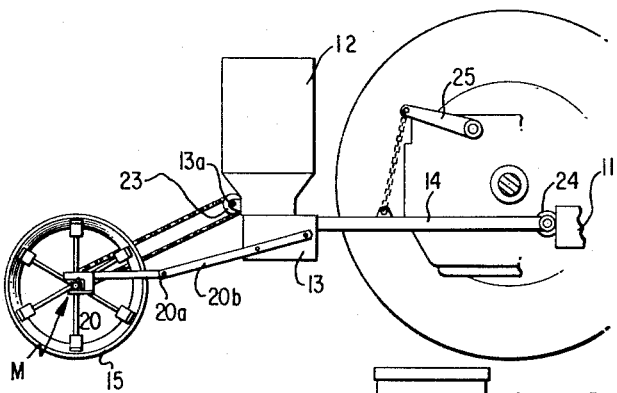
Figure 8:
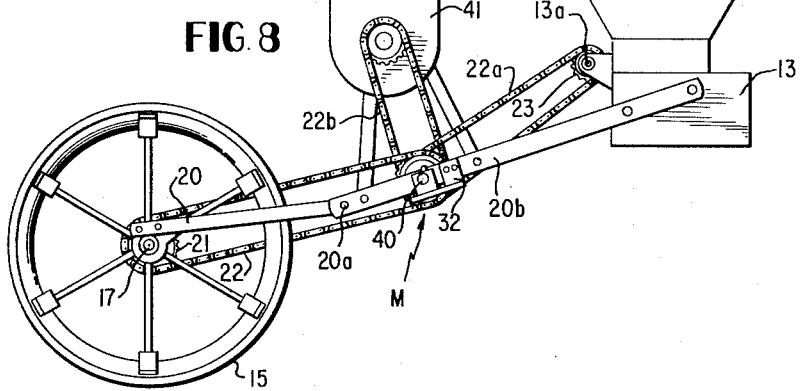

FIGURE 7 is a somewhat diagrammatic side-view of FIGURE 1, illustrating the manner in which the crop-planting measurer is rendered operative and inoperative and the manner in which the planter is actuated from the presser-wheel; and FIGURE 8 is a side elevation of a type of planter, wherein a seed-dispenser planter and a fertilizer are actuated from a jack-shaft by the presser-wheel and the crop-planting measurer is disposed at the jack or counter shaft.

Referring to the drawings in detail, in which like characters of reference refer to similar or like parts throughout the several views, FIGURE 1 illustrates a four-row planter 10 of recently improved design drawn by a tractor 11. Planter 10 comprises four individual and horizontally spaced seed-hoppers 12, each overlying a seed dispensing mechanism 13 supported by a supporting frame 14 to deliver therefrom in periodic succession a predetermined number of seed to an underlying furrow in a seed-bed, in the well-known manner. Each seed-dispenser 13 is actuated by a trailing presser-wheel 15 (which packs the seeded row after the furrow has been closed by the disc 16).

In most planters, as shown in the drawings, each presser-wheel 15 is fast on an axle 17 which has its ends journaled in bearings 18 secured by bolts 19 to the rear ends respectively of a bifurcated presser-wheel frame 20. The fore ends of the frame 20 are pivoted for vertical movement, as at 20*a*, to the ends, respectively, of a yoke-shaped bracket 20*b*, secured to the casing of its seed-dispenser 13.

A sprocket wheel 21 is fast on one end of each axle 17, over which a sprocket chain 22 is trained and meshes with a sprocket 23 on a shaft 13*a* of the seed-dispenser 13.

The supporting frame 14 of the planter is pivotally and detachably connected, as at 24 (see FIG. 7), to the frame of the tractor 11 so as to be swung, as a whole, upwardly and downwardly to move all the presser-wheels 15 from and to ground-engaging position by suitable lifting means. This lifting means is usually carried by the tractor and is generally indicated by the lever and chain 25 in FIGURE 7, the lever being power-operated and controlled by the operator of the tractor. Each of the seed-dispensers 13 may be rendered operative or inoperative individually by an attendant, riding on the seat 26 of the planter, through means of hand levers 27 pivotally connected to the frame 20 and having a spring pressed latch means cooperating with a toothed segment 28.

The central feature of the present invention is the provision of a very simple and inexpensive means for mounting a conventional odometer 30 (now available on the market) on the frame of a planter, of modern construction as above described, without any change or other modification to the planter or to the odometer, so as to be adjacent to and continuously actuated by a rotatable part of the seed-dispensing actuator of the planter that is operated by a trailing seed-bed presser-wheel 15 while in engagement with the ground but, when out of engagement with the ground, the odometer is not operated.

The conventional odometer 30, as manufactured and now available, comprises a housing *h* containing a counter-mechanism having a viewing-window *w* through which the registered revolutions of the counter may be observed; also, one end of the actuating shaft *s* of said mechanism projects from the housing and has a crank lever arm *a* fast thereon and the other end of such shaft is equipped with a resetting knob *k*.

Figure 5:
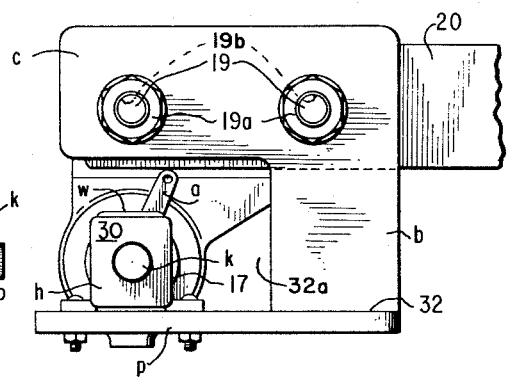
FIGURE 5 is an elevation of the invention shown in FIGURE 4 looking in the direction of the arrow *b* in FIGURE 4.

It is preferred to mount the odometer 30 opposite and in spaced axial alignment with one end of the axle 17 of one of the presser-wheels 15 of the planter, as shown more particularly in FIGURE 2, and thereby take advantage of and make use of the bolts 19 usually provided to secure the axle journal bearing 18 to the presser-wheel frame. To this end, a generally L-shaped bracket 32 is formed from a rectangular strip of plate-like material of considerable width, the upper face of one of its legs forming a horizontal platform *p* and its other or vertical leg being cut-away along one of its vertical edges upwardly from the platform *p* and inwardly from said edge for a distance to provide an opening 32*a* (see FIG. 5) which is bordered on one side by the vertical support *b* for platform *p* and overlaid by the attaching arm *c*, which latter has two apertures 19*b* therein to align with the bolts 19, thus offsetting the support *b* laterally of the end of the axle 17 when the bracket 32 is secured to the frame 20. The odometer 30 is mounted on the platform *p*, by means of screws 33, in the area thereof opposite the opening 32*a* with the end of its shaft *s*, carrying the lever arm *a*, opposing and in spaced and substantial axial alignment with the end of the axle 17 so that, by removing the nuts 19*a*, the apertures in the bracket arm *c* may be slid over the threaded ends of the bolts 19 and then, by replacing the nuts 19*a*, the bracket 32 is firmly secured to the presser-wheel frame 20 with the shaft *s* of the counter-mechanism and the axle 17 in spaced axial alignment.

A finger 31 is mounted on the end of the axle 17 and is of a length to project axially therefrom into the plane of movement of the lever arm *a*, but is laterally offset from the axial center of the axle 17 so as to actuate the crank lever arm *a* of the counter-mechanism therewith as the finger describes a circle with the movement of the axle.

Figure 4:
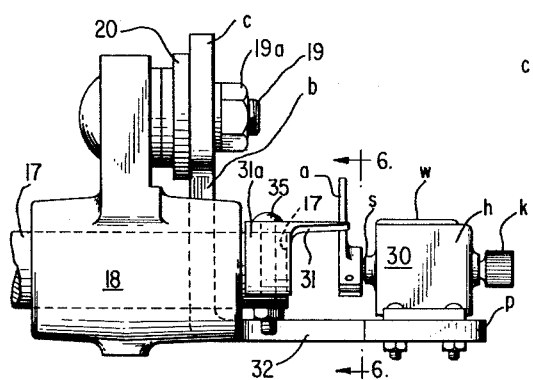
FIGURE 4 is a fragmentary elevation of FIGURE 2 looking in the direction of the arrow *a* in FIGURE 2 illustrating the arrangement of parts of the crop-planting measurer.
Figure 6:
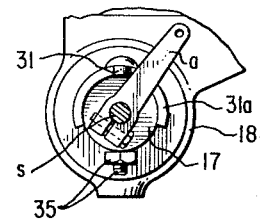
FIGURE 6 is a sectional view taken substantially on line 6—6 of FIGURE 4.

The finger 31 is preferably of a T-shaped piece of plate material, the head of which is of a width greater than that of its stem and said head is of such length as to form a split-collar 31*a*, when curved or arcuated, that will fit and grip about the circumferential surface of the end portion of the axle 17 or extend for a substantial distance therearound, as shown in FIGURES 2, 4 and 6, to provide a substantial bearing surface area on the axle in order to keep the finger from tilting relative to said axle. Since each of the ends of the axle 17 of the presser-wheel 15 is usually provided with a diametrical aperture extending therethrough to receive a cotter-pin 34 or other stop-abuttment element outboard of the journal-bearing 18, a center opening is provided in the head of the T-shaped finger and positioned to align with the aperture in the end of the axle, when the arcuate head portion is applied to the axle with the cotter-pin removed; and the cotter-pin 34 may be replaced to hold the finger 31 firmly in position or a bolt and nut 35 may be substituted for the cotter-pin, as shown.

In FIGURE 3, the crop-planting-measurer of this invention may be shielded against falling objects and the undue accumulation of dirt and dust; and, to this end, an L-shaped plate 36 is provided either as a separate element or as an integral part of the bracket 32. The shield 36 is of sufficient area so that, when applied as shown in FIGURE 3, one of its legs is arranged horizontally and overlies the parts 30, 31 and 32 and its other leg forms a forward vertical wall to protect said parts from objects which may strike it during the forward movement of the planter, the horizontal leg being provided with a sight opening *o* overlying the viewing-window *w* in the odometer and covered by a hinged lid *d*. If used as a separate element, the shield 36 is held in position and secured to the bracket 32 through the medium of screws 36*c*.

While the above described construction and arrangement of parts is preferred, the crop-planting-measurer of the present invention may be used in connection with a jack-shaft 40 journalled in the rear end portion of the yoke frame 20*b* to which the presser-wheel frame 20 is pivotally connected. With this arrangement, the presser-wheel 15 drives the jack-shaft 40, through sprocket chain 22, which drives the seed-dispenser 13 and a fertilizer distributor 41 by means of sprocket chains 22*a* and 22*b*, respectively, as shown in FIGURE 8. In such type of planters, the arm *c* of the bracket 32 may be omitted and its vertical leg secured by bolts directly to a side member of said yoke frame, as shown in FIGURE 8, to obtain the same arrangement and positions of the parts 30 and 31 with respect to the jack-shaft 40, as is shown particularly in FIGURES 2, 4, 6 and 7.

In the use of this invention on a planter and with the planter so equipped, the principle of counting the number of revolutions, made by the presser-wheel, determines the distance traveled, when planting row crops. Since the diameters of the presser-wheels vary somewhat with different manufactures of planters and since row-spacing may vary for different crops, a reference chart accompanies each crop planting-measurer to give the number of revolutions of the presser-wheel the counter will register for one acre of land with respect to planters of different sizes (i.e. two, four or six row planters) of different manufactures. As one example, with the model 484 John Deere four row-planter, as shown in FIGURE 1, with row spacing of 38 inches, the odometer 30 will register 605 revolutions for one acre. Hence, knowing the revolutions the odometer will register for one acre with respect to any type of planter according to its row-spacing, the total acreage planted may be determined by dividing the revolution for one acre into the total number of revolutions registered on the odometer for any given planting of crops.

From the above it will be clear that a very inexpensive and a very simple crop planting-measurer device, consisting of two separate parts (i.e. (1) the bracket 32 with the odometer 30 secured thereto and (2) the finger 31), is provided which may be very quickly attached and quickly removed from the planter by the farmer himself without any modification in the planter and using the fasteners already on the planter for the attachment of the measuring device of this invention; that because of the location of the planting-measurer on the planter, so as to be actuated by the presser-wheel only, when the latter is in engagement with the ground, the acreage actually planted will be accurately measured without the necessity of pre-measuring the acreage; and that there are a minimum of operating parts to get out of order or malfunction.

Having thus fully described the invention and the manner in which it is to be performed, it is manifest that its novelty resides in its simplicity resulting from the sundry details of construction of its component parts and in the combination and arrangement of those parts.

That which is claimed, as new and to be secured by Letters Patent, is:

A new article of manufacture for use with a rotatable axle of a seed-bed presser-wheel of a crop-planter having journal-bearings for the axle and exposed nutted-bolts securing said bearings to a presser-wheel frame, said article comprising a relatively wide bracket L-shaped in cross-section, a side edge of one leg of which being formed at its free end portion with a arm extending laterally planar therewith and having openings therein positioned to be applied to and to receive the exposed ends of said bolts to secure the bracket in position on said frame, the other of said legs of the bracket being formed with a laterally projecting extension extending in the same direction as said arm of said first mentioned leg to form a platform; an odometer, having a rotatable actuating shaft provided with a crank-lever fixed thereon, mounted and disposed on said platform to position said crank-lever opposite the end of said axle and in spaced and substantially axial alignment therewith, when said bracket is mounted and secured on said frame by said bolts, a finger-like member detachably secured to said axle and extending axially and outwardly therefrom into the plane of movement of said crank-lever and arranged to describe a circle, as said axle rotates, to engage and continuously rotate said crank-lever for causing said odometer to register the revolutions of said axle, during the rotatable movement of said axle.

References Cited in the file of this patent

UNITED STATES PATENTS

| | | |
|---|---|---|
| 308,632 | See | Dec. 2, 1884 |
| 1,544,079 | Veeder | June 30, 1925 |
| 2,712,899 | Krtous | July 12, 1955 |
| 2,741,031 | Martin | Apr. 10, 1956 |
| 2,772,832 | Lassiter | Dec. 4, 1956 |